(12) United States Patent
Wei et al.

(10) Patent No.: US 11,288,877 B2
(45) Date of Patent: Mar. 29, 2022

(54) METHOD FOR MATCHING A VIRTUAL SCENE OF A REMOTE SCENE WITH A REAL SCENE FOR AUGMENTED REALITY AND MIXED REALITY

(71) Applicant: 38TH RESEARCH INSTITUET, CHINA ELECTRONICS TECHNOLOGY GROUP CORPORATION, Anhui (CN)

(72) Inventors: Yixiong Wei, Anhui (CN); Hongqi Zhang, Anhui (CN); Yanlong Zhang, Anhui (CN); Lei Guo, Anhui (CN); Hongqiao Zhou, Anhui (CN); Qianhao Wu, Anhui (CN); Fujun Tian, Anhui (CN)

(73) Assignee: 38TH RESEARCH INSTITUTE, CHINA ELECTRONICS TECHNOLOGY GROUP CORP., Hefei (CN)

( * ) Notice: Subject to any disclaimer, the term of this patent is extended or adjusted under 35 U.S.C. 154(b) by 0 days.

(21) Appl. No.: 17/139,677

(22) Filed: Dec. 31, 2020

(65) Prior Publication Data

US 2021/0217244 A1 Jul. 15, 2021

Related U.S. Application Data

(63) Continuation of application No. PCT/CN2020/072871, filed on Jan. 17, 2020.

(30) Foreign Application Priority Data

Jan. 10, 2020 (CN) .......................... 202010027417.2

(51) Int. Cl.
*G06T 19/00* (2011.01)
*G06T 7/70* (2017.01)
(Continued)

(52) U.S. Cl.
CPC .......... *G06T 19/006* (2013.01); *G06K 9/0063* (2013.01); *G06K 9/03* (2013.01);
(Continued)

(58) Field of Classification Search
CPC ..................... G06T 19/006; G06T 7/70; G06T 2207/10024; G06T 2207/10028; G06K 9/0063; G06K 9/03
(Continued)

(56) References Cited

U.S. PATENT DOCUMENTS

2013/0120372 A1* 5/2013 Lee .......................... G06T 15/00
345/419
2015/0254881 A1* 9/2015 Duan ....................... G06T 11/20
345/660
(Continued)

FOREIGN PATENT DOCUMENTS

CN 102395997 A 3/2012
CN 104995583 A 10/2015
(Continued)

*Primary Examiner* — Hai Tao Sun

(57) ABSTRACT

Provided is a method for matching a virtual scene of a remote scene with a real scene for augmented reality and mixed reality. Multiple coordinate systems are established and a position relationship between the multiple coordinate systems is determined. A position of a point cloud scene in the near-side environmental space and the position of the near-side virtual scene are determined in the near-side environmental space through real marks, so as to realize the high-precision matching and positioning for augmented reality and mixed reality. Based on the position of objects marked in the real space, the method realizes adaptive and accurate positioning of the virtual objects in the augmented reality and mixed reality by overcoming spatial barriers. The scene in the virtual space is accurately superimposed into the near-side environmental space.

6 Claims, 4 Drawing Sheets

(51) Int. Cl.
   *G06K 9/03*          (2006.01)
   *G06K 9/00*          (2022.01)
(52) U.S. Cl.
   CPC ...... *G06T 7/70* (2017.01); *G06T 2207/10024* (2013.01); *G06T 2207/10028* (2013.01)
(58) Field of Classification Search
   USPC ........................................................ 345/633
   See application file for complete search history.

(56) References Cited

U.S. PATENT DOCUMENTS

2017/0105701 A1*   4/2017   Pelissier ................ G16H 30/40
2018/0197308 A1    7/2018   Kasuya et al.
2019/0371074 A1*  12/2019   Pintaric .................. G06T 17/20

FOREIGN PATENT DOCUMENTS

| CN | 105787941 A | 7/2016 |
|----|-------------|--------|
| CN | 106898049 A | 6/2017 |
| CN | 107408314 A | 11/2017 |
| CN | 108346183 A | 7/2018 |
| CN | 109144349 A | 1/2019 |
| CN | 109272454 A | 1/2019 |
| CN | 109421048 A | 3/2019 |

\* cited by examiner

METHOD FOR MATCHING A VIRTUAL SCENE OF A REMOTE SCENE WITH A REAL SCENE FOR AUGMENTED REALITY AND MIXED REALITY

CROSS-REFERENCE TO RELATED APPLICATIONS

This application is a continuation of International Application No. PCT/CN2020/072871, filed on Jan. 17, 2020, which claims the benefit of priority from Chinese Patent Application No. 202010027417.2, filed on Jan. 10, 2020. The content of the aforementioned applications, including any intervening amendments thereto, is incorporated herein by reference.

TECHNICAL FIELD

The present application relates to augmented reality and mixed reality, and more particularly to a method for matching a virtual scene of a remote scene with a real scene for augmented reality and mixed reality.

BACKGROUND

Augmented and mixed reality technology is to seamlessly superimpose computer-simulated digital information data with the real scene, which can break through the limitation of space and time to realize real-time information guidance and virtual-real interaction with high immersion and a sense of integration. Its essence is "what you see is what you get, what you touch is what it presents". With this technology, the information displayed and interacted on the screen can be replaced with three-dimensional information that is strongly associated with the actual environmental objects, and users can directly view the three-dimensional information.

Augmented and mixed reality has been used for remote auxiliary operation and maintenance and training. With the help of augmented and mixed reality technology, operators can get full-scale digital scenes and equipment products that match the real scene accurately at a remote side, and operate in a virtual space. Persons in real scenes view physical objects and the virtual equipment products superimposed in the real scenes, and can be assisted to operate based on the guidance in the virtual space given by the remote operators. In this way, the digital virtual space overcome spatial obstacles, and the superposition of virtual scenes and real scenes realizes intuitive guidance. For some areas that humans cannot reach, humans can observe and interact with remote scenes through remote virtual-real positioning and superimposing methods.

However, it is found that the application of augmented and mixed reality is in the early stage, and related application scenarios have not yet been implemented. There is no practical technical method for high-precision matching and positioning of remote scenes. The existing methods cannot realize high-precision matching and positioning for remote scenes, for example, the remote scenes can only be roughly matched and positioned at the meter level, or locally matched and positioned using landmarks or specific patterns and textures.

SUMMARY

Given the above, the present disclosure aims to provide a method for matching a virtual scene of a remote scene with a real scene for augmented reality and mixed reality, which can solve the problem of inaccurate matching and positioning in the prior art.

Provided is a method for matching a virtual scene of a remote scene with a real scene for augmented reality and mixed reality, comprising:

establishing a global coordinate system (GCS) at a position of a near-side virtual scene and a corresponding position of the remote scene, respectively;

in the remote scene: determining at least one physical mark that is stationary relative to the GCS; placing a remote camera for obtaining point cloud data of the remote scene, and building a camera coordinate system (CCS) based on the remote camera; wherein the CCS and the GCS are relatively fixed;

in a near-side environmental space: setting a real mark that is the same as the physical mark according to a position relationship between the physical mark and the GCS; establishing an augmented reality (AR)/mixed reality (MR) environmental coordinate system (ECS) by taking a position of an augmented reality (AM)/mixed reality (MR) device as an origin of the AR/MR ECS, and measuring the a position relationship between the GCS and the AR/MR ECS;

in the near-side virtual scene: adding a virtual mark that is the same as the physical mark according to the position relationship between the physical mark and the GCS; and obtaining position information of the real mark in the near-side environmental space using a camera of the AR/MR device; determining a position of the point cloud scene fitted from point cloud data of the remote scene and a position of the near-side virtual scene in the near-side environmental space based on the position information of the real mark in the near-side environmental space.

In some embodiments, the method further comprises:
establishing a mark coordinate system (MCS) in the remote scene according to a mark point of the physical mark, wherein x, y, z directions of the MCS are consistent with x, y, z directions of the GCS; and a position relationship between the physical mark and the GCS is represented by a position relationship between the MCS and the GCS; and based on a corresponding relationship between the real mark and the physical mark, establishing an MCS in the near-side environmental space according to a mark point of the real mark; wherein a position relationship between the real mark and the GCS is represented by the position relationship between the MCS and the GCS.

In some embodiments, the step of establishing the global coordinate system (GCS) at the position of the near-side virtual scene and the corresponding position of the remote scene, respectively, comprises:

establishing the GCS at the remote scene and the GCS at the corresponding position of the near-side virtual scene through right-hand rule.

In some embodiments, wherein the CCS comprises a point cloud data coordinate system generated by shooting the remote scene through the remote camera.

In some embodiments, the step of obtaining the position information of the real mark in the near-side environmental space using the camera of the AR/MR device comprises:

determining a position relationship of the real mark and the camera through RGB image recognition and depth information capture; obtaining a position relationship between the real mark and the AR/MR ECS, and determining the position information of the real mark in the near-side environmental space.

In some embodiments, the step of determining the position of the point cloud scene fitted from the point cloud data of the remote scene and the position of the near-side virtual scene in the near-side environmental space based on the position information of the real mark in the near-side environmental space comprises:

determining the position information of the GCS in the near-side environmental space according to the position information of the real mark in the near-side environmental space and the position relationship between the real mark and the GCS;

determining the position of the near-side virtual scene in the near-side environmental space according to the position information of the GCS in the near-side environmental space; and determining the position of the point cloud scene in the near-side environmental space according to the position information of the real mark in the near-side environmental space, the corresponding relationship between the real mark and the physical mark, and the position relationship of the CCS and the GCS.

In some embodiments, the method further comprises:

correcting an error between a virtual scene and a real scene;

wherein correction methods comprise a reverse-fitting adjustment method;

wherein the reverse-fitting adjustment method is a correction method for a fixed error source, and comprises:

correcting a position error of the real mark;

correcting a mark error of a mark point of the real mark;

correcting an error of a corresponding relationship of the GCS in the virtual scene and the GCS in the real scene; and correcting a distortion error caused by a shooting angle of the remote camera.

In some embodiments, the method further comprises:

correcting an error between a virtual scene and a real scene;

wherein correction methods comprise a multi-mark-points matching method;

wherein the multi-mark-points matching method comprises:

setting a plurality of real marks in the near-side environmental space;

averaging the position information of the real marks in the near-side environmental space scanned by the camera in the AR/MR device to obtain an average of the position information; and determining the position of the point cloud scene fitted from the point cloud data of the remote scene in the near-side environmental space and the position of the near-side virtual scene in the near-side environmental space according to the average of the position information.

In some embodiments, the method further comprises:

correcting an error between a virtual scene and a real scene;

wherein the correction methods comprise a multiple-users-assisted deployment method;

wherein the multiple-users-assisted deployment method comprises:

scanning the real mark by multiple user devices to obtain position data;

averaging the position data in a communication server to obtain an average of the position information of the real mark in the near-side environmental space; and determining the position of the point cloud scene fitted from the point cloud data of the remote scene in the near-side environmental space and the position of the near-side virtual scene in the near-side environmental space according to the average of the position information.

Compared to the prior art, the method of the present invention has the following beneficial effects.

Multiple coordinate systems are established and the position relationships between the multiple coordinate systems are determined. The point cloud scene in the near-side environmental space and the position of the near-side virtual scene are determined in the near-side environmental space through the real mark, so as to realize the high-precision matching and positioning for augmented reality and mixed reality. Through the method of the present invention, based on the position of an object marked in the real space, it is possible to realize adaptive and accurate positioning of the position of the virtual objects in the augmented reality and mixed reality by overcoming spatial barriers. The scene in the virtual space is accurately merged into the near-side environmental space, which is convenient to realize the interactive operations, such as remote training and teaching, auxiliary guidance, under the comparison of the virtual reality and the real reality.

BRIEF DESCRIPTION OF THE DRAWINGS

In order to explain the embodiments of the present disclosure or the technical solutions in the prior art more clearly, the drawings required in the embodiments or the description of the prior art will be briefly introduced as follows. Obviously, the drawings in the following description are only some embodiments of the present disclosure. For those of ordinary skill in the art, other drawings can be obtained without paying any creative efforts according to the structures shown in these drawings.

DETAILED DESCRIPTION OF EMBODIMENTS

In order to render the objects, technical solutions and beneficial effects of the invention clearer, the invention will be described below in detail in conjunction with embodiments. Obviously, the described embodiments are only a part of the embodiments of the present disclosure. For those of ordinary skill in the art, other embodiments can be obtained without paying any creative efforts based on the embodiments of the present disclosure and shall fall within the protection scope of the present disclosure.

The present disclosure provides a method for matching a virtual scene of a remote scene with a real scene for augmented reality and mixed reality, which solves the problem of inaccurate matching and positioning in the prior art and realizes high-precision matching and positioning of the virtual scene and the real scene.

The principle of the embodiment of the present disclosure is as follows. Multiple coordinate systems are established and the position relationships between the multiple coordinate systems are determined. The position of the point cloud scene of the remote space and the position of the near-side virtual scene in the near-side are determined in a near-side environmental space through the real mark, so as to realize the high-precision matching and positioning for augmented reality and mixed reality.

In order to facilitate the understanding of the above technical solutions, the disclosure will be further described in detail below with reference to the accompanying drawings in embodiments.

Figure 1:
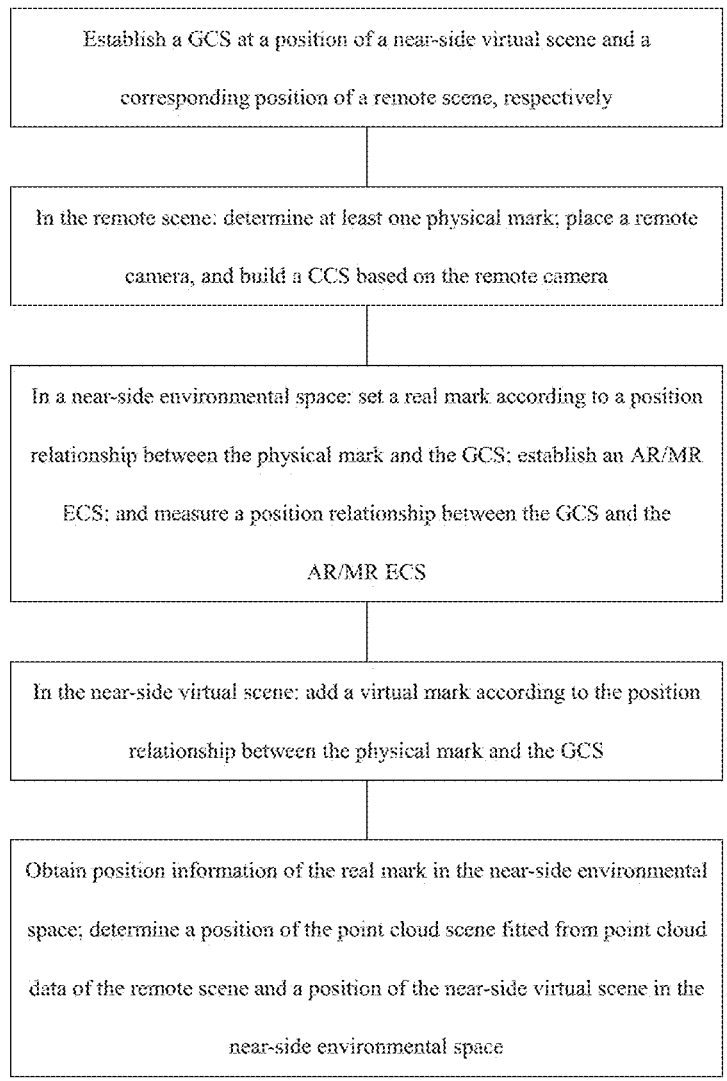
FIG. 1 is a block diagram of a method for matching a virtual scene of a remote scene with a real scene for augmented reality and mixed reality according to at least one embodiment of the present disclosure.
Figure 2:
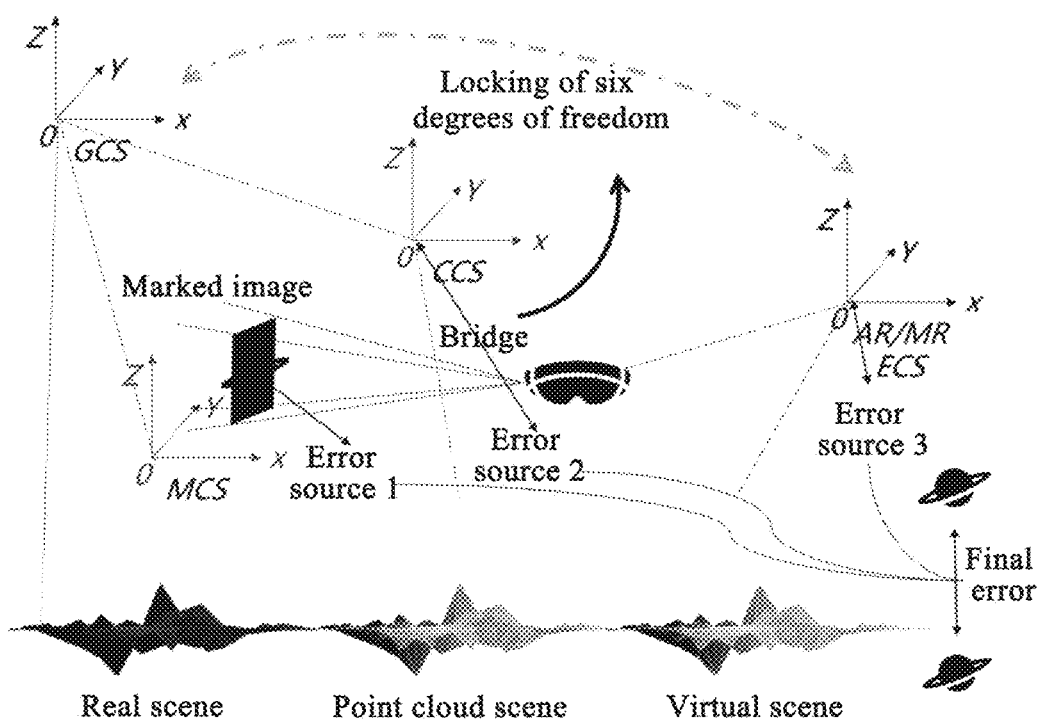
FIG. 2 shows a positioning principle and error source analysis of the method for matching the virtual scene of the remote scene with the real scene for augmented reality and mixed reality according to at least one embodiment of the present disclosure.

As shown in FIG. 1, the present disclosure provides a method for matching a virtual scene of a remote scene with a real scene for augmented reality and mixed reality, and the specific implementation process is as follows.

S1. A global coordinate system (GCS) is established in a near-side virtual scene and a remote scene, respectively.

S2. In the remote scene: at least one physical mark that is stationary relative to the GCS is determined. A remote camera for obtaining point cloud data of the remote scene is placed. A camera coordinate system (CCS) is established based on the remote camera. The CCS and the GCS are relatively fixed.

S3. In a near-side environmental space: a real mark that is the same as the physical mark is set according to a position relationship between the physical mark and the GCS in the remote scene. An augmented reality (AR)/mixed reality (MR) environmental coordinate system (ECS) is established by taking a position of an augmented reality (AR)/mixed reality (MR) device as an origin, and a relative position between the GCS and the AR/MR ECS is measured.

S4. In the near-side virtual scene: a virtual mark that is the same as the physical mark is added according to the position relationship between the physical mark and the GCS.

S5. A camera in the AR/MR device is used to obtain position information of the real mark in the near-side environmental space. A point cloud scene fitted from point cloud data of the remote scene and a position of the near-side virtual scene in the near-side environmental space are determined by the position information of the real mark in the near-side environmental space.

In the present disclosure, multiple coordinate systems are established and the position relationships between the multiple coordinate systems are determined. The point cloud scene in the near-side environmental space and the position of the near-side virtual scene are determined in the near-side environmental space through the real mark, so as to realize the high-precision matching and positioning for augmented reality and mixed reality. Through the method of the present disclosure, based on the position of an object marked in the real space, it is possible to realize adaptive and accurate positioning of the position of the virtual objects in the augmented reality and mixed reality by overcoming spatial barriers. The scene in the virtual space is accurately superimposed into the near-side environmental space, which is convenient to realize the interactive operations, such as remote training and teaching, auxiliary guidance, under the comparison of the virtual reality and the real reality.

These steps are described in detail below.

It should be noted that in the embodiment of the present disclosure, the near-side environmental space refers to the real scene at the near-side; the remote scene includes the real scene at the remote and the virtual scene at the remote.

The real scene refers to the application environment of the AR/MR device, for example, the application environment includes the floor, walls, tables, chairs, and personnel when the AR/MR device is used indoors.

Virtual scenes refer to the corresponding virtual ground, walls, tables, chairs, personnel and other attached information that are constructed in the storage system of the AR/MR device in advance and projected in an actual scene by using AR/MR device in the later stage.

The point cloud scene refers to a virtual scene model fitted from point cloud data, and the point cloud data has depth information and is obtained by photographing and scanning with a remote camera. It should be noted that the point cloud scene also includes all the remote information that needs to be accurately located in the real scene.

The step 1 includes the following steps.

The GCSs are established at the corresponding positions of the near-side virtual scene and the remote real scene through right-hand rule. In the specific implementation process, the GCS is constructed in a changeless, relatively regular and flat area in the actual scene.

The step 2 includes the following steps.

S201. At least one physical mark that is relatively constant to GCS is determined in the remote scene. The MCS is established according to a mark point of the physical mark. In the embodiment of the disclosure, the mark point is a central point of the physical mark, and x, y, z directions of the MCS are consistent with x, y, z directions of the GCS. A position relationship between the physical mark and the GCS is represented by a position relationship between the MCS and the GCS. It should be noted that a storage system of the AR/MR device can determine at least one physical mark in the remote virtual scene, or place at least one physical mark in the remote real scene. Easy deployment and identification should be considered in the selection of the location of the physical mark in the remote scene.

S202. The remote camera for obtaining point cloud data of the remote scene is placed, and the CCS is established based on the remote camera. The position relationship is established between GCS and CCS. In the embodiment of the present disclosure, the CCS refers to the point cloud data coordinate system generated by photographing the real scene through the remote camera. Since the CCS and the GCS are relatively fixed, the point cloud data generated by remote camera can be directly converted into the point cloud data of the GCS.

The step 3 includes the following steps.

S301. The real marks are applied in the near-side environmental space. The real marks and physical marks are exactly the same. The marks can be images or two-dimensional codes with the same size and shape. It should be noted that using natural features as real marks is also covered in the scope of the embodiment of the invention. According to the corresponding relationship between the real mark and the physical mark, the MCS is established based on the mark point of the real mark, and the position relationship between the real mark and the GCS is represented by the position relationship between the MCS and the GCS.

S302. The AR/MR ECS is established by taking a position of the AM/MR device as the origin of AR/MR ECS, and the position relationship between the GCS and the AR/MR ECS is determined.

The step 4 includes the following steps.

The virtual marks are applied in the near-side virtual scene. The real marks and physical marks are exactly the same and can be images or two-dimensional codes with the same size and shape. According to the corresponding relationship between the virtual mark and the physical mark, MCS is established according to the mark point of the virtual mark, and the position relationship between the virtual mark and GCS is represented by the position relationship between MCS and GCS.

The step 5 includes the following steps.

S501. RGB image recognition and depth information capture of the camera are used to determine a position relationship of the real mark and the camera, and then a position relationship between the real mark and AR/MR ECS is obtained, and the location information of the real mark in the near-side environmental space is determined.

S502. The position of the point cloud scene in the near-side environmental space is determined according to the position information of the real mark in the near-side environmental space, the corresponding relationship between the real mark and the physical mark, and the position relationship of the CCS and the GCS.

S503. The position information of the GCS in the near-side environmental space is determined according to the position information of the real mark in the near-side environmental space and the position relationship between the real mark and the GCS, so as to determine the position of the near-side virtual scene in the near-side environmental space.

In the embodiments of the present disclosure, in order to further improve the accuracy of matching and positioning for augmented and mixed reality, correction methods are proposed for correcting the error between virtual scene and real scene based on the positioning principle and error source analysis. The correction methods include a reverse fitting adjustment method, a multi-mark-points matching method and a multiple-user-assisted deployment method.

The correction for fixed error sources includes: correcting for the position error of real marks, correcting for the mark error of mark points of real marks, correcting for the corresponding errors of the GCSs in the virtual scene and real scene, and correcting for the distortion errors caused by the shooting angle of cameras. By repeatedly scanning the real mark by the AR/MR device, the plotted error curve is fitted as a function, and the reverse adjustment is performed inside the AR/MR device system.

The multi-mark-points matching method includes the following steps.

A plurality of the real marks are set in the near-side environmental space, and the position information of the real marks in the near-side environmental space is scanned by the camera in the AR/MR device, and is averaged to obtain the average of the position information. The position of the point cloud scene fitted from the point cloud data of the remote-scene and the position of the near-side virtual scene are determined in the near-side environmental space according to the average of the position information.

The averaging process is described as follows. Coordinates $(t_1, t_2, \ldots, t_N)$ of the real marks are averaged to obtain an average a $(a=(\Sigma_1^N t_x)/N)$, where the coordinates of different dimensions are averaged separately. Then the sample variance $$S\left(S = \left(\sum_1^N (t_x - a)^2\right)/(N-1)\right)$$

of the coordinates of the respective dimension is calculated; if $S \leq 0.01$, the average a is adopted; otherwise, coordinates of the real marks are reacquired to recalculate the average a. It should be noted that the averaging method proposed in the embodiment is only one of the averaging methods, and the averaging methods of the present disclosure are not limited to this method.

The multiple-users-assisted deployment method includes the following steps.

Position data of the real mark is obtained from multiple users, and these position data is averaged in a communication server to obtain the average of the position information of the real mark in the near-side environmental space. The position of the point cloud scene fitted from the point cloud data of the remote scene in the near-side environmental space and the position of the near-side virtual scene in the near-side environmental space are determined according to the average of the position information.

Embodiment 1

In order to further describe the method of the embodiment of the present disclosure, the specific process of the embodiment of the disclosure is explained in detail by taking a Mars probe as an example.

The Mars probe is set in an outer planet where humans cannot reach at present, and topographies of Mars cannot be directly known. By using the method of the embodiment of the present disclosure, the topography of Mars can be visually presented in the environmental space where human beings are located, and at the same time, some physical objects (such as full-scale probes) or environments can be accurately matched with the virtual topography of Mars, so that operators have a real presence.

Figure 3:
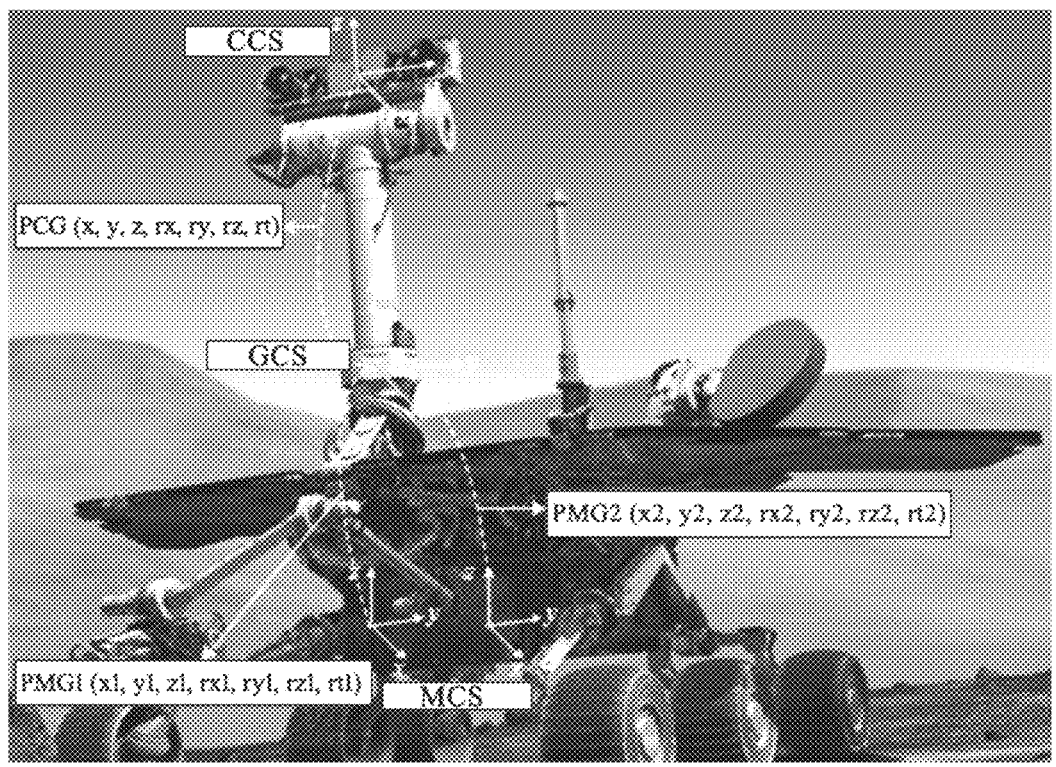
FIG. 3 is a schematic diagram of coordinate systems and their position relationships according to at least one embodiment of the present disclosure.

Step 1. A GCS is established by selecting a point on the Mars probe as an origin. In this embodiment, a center of a turntable of an arm of the Mars probe is selected as the origin of the GCS, and z direction of the GCS is upward along the length of the arm, and x and y directions of the GCS are determined according to the right-hand rule, as shown in FIG. 3. A coordinate system of a binocular camera mounted on the arm is selected as a CCS (the coordinate system orientation defined by different binocular cameras may be different).

Step 2. After the coordinate systems are determined, the position relationship PCG (x, y, z, rx, ry, rz, rt) of CCS relative to GCS is obtained on the ground. Where (x, y, z) is the displacement coordinate, (rx, r, rz, rt) is the quaternion which represents the rotation relationship of CCS relative to GCS.

Step 3. A position of a physical mark is determined. The position of the physical mark is fixed relative to the GCS, which will not change during the operation or movement of the Mars probe. If there are a plurality of physical marks on the Mars probe in order to optimize the matching of positions of the physical marks and reduce the error for positioning the physical marks, a certain distance and an angle should be ensured between the physical marks. As shown in FIG. 3, an MCS is determined for each mark point, and the position relationships, such as PMG1 (x1, y1, z1, rx1, ry1, rz1, rt1) and PMG2 (x2, y2, z2, rx2, ry2, rz2, rt2), of MCSs relative to the GCS must be measured after the position of the physical mark is confirmed.

Figure 4:
FIG. 4 is a schematic diagram of real marks in an environmental space where humans are located according to at least one embodiment of the present disclosure.

Step 4. A real mark is fixed in the environmental space where humans are located, as shown in FIG. 4. Because the real Mars probe is not available in the environmental space where humans are located, the real mark is fixed on a wall, where the position relationships PMG1 and PMG2 are consistent with the set values.

Figure 5:
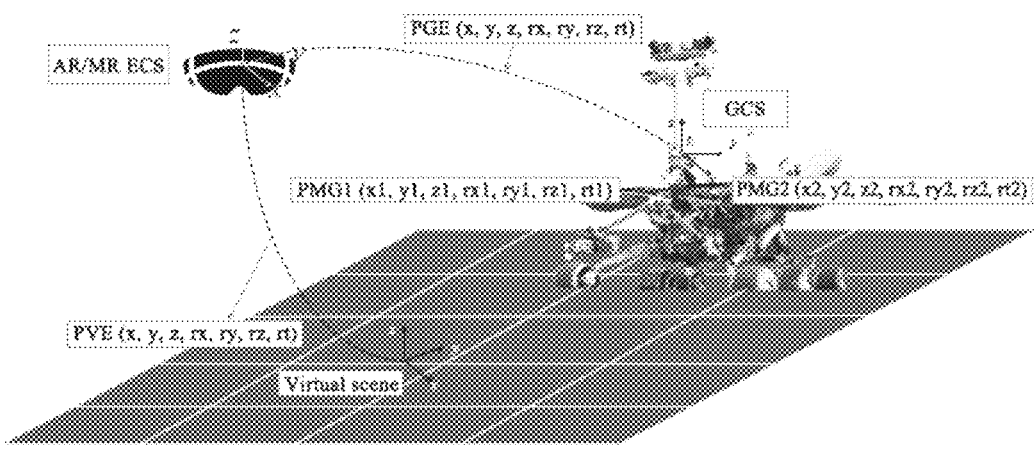
FIG. 5 is a schematic diagram of an AR/MR ECS and a virtual scene according to at least one embodiment of the present disclosure.

Step 5. As shown in FIG. 5, the virtual scene is set in the AR/MR system and the GCS of the virtual scene is established. The relative position relationship PGE (x, y, z, rx, ry, rz, rt) of the GCS in the virtual scene with respect to the AR/MR environment coordinate system (AR/MR ECS) is determined. Then the position relationship PVE (x, y, z, rx, ry, rz, rt) of the virtual scene relative to the AR/MR ECS is determined.

Step 6. As shown in FIG. 5, digital marks are added in the AR/MR system, and the position relationship of coordinates of the digital mark relative to the GCS in the virtual scene should be consistent with the position relationships PMG1 and PMG2, respectively.

Step 7. The real marks are identified by an AR/MR device to obtain the location information of each real mark which is P1 (x1, y1, z1, rx1, ry1, rz1, rt1) and P2 (x2, y2, z2, rx2, ry2, rz2, rt2), respectively, in the physical environment. Different devices and different physical space coordinate systems in different systems do not affect the final result.

Step 8. The position relationships PGR1 (x1, y1, z1, rx1, ry1, rz1, rt1) and PGR2 (x2, y2, z2, rx2, ry2, rz2, rt2) of the GCS relative to the environmental space where humans are located are obtained through the inverse calculation using the position relationship data of PMG1 and PMG2 combined with P1 and P2.

Figure 6:
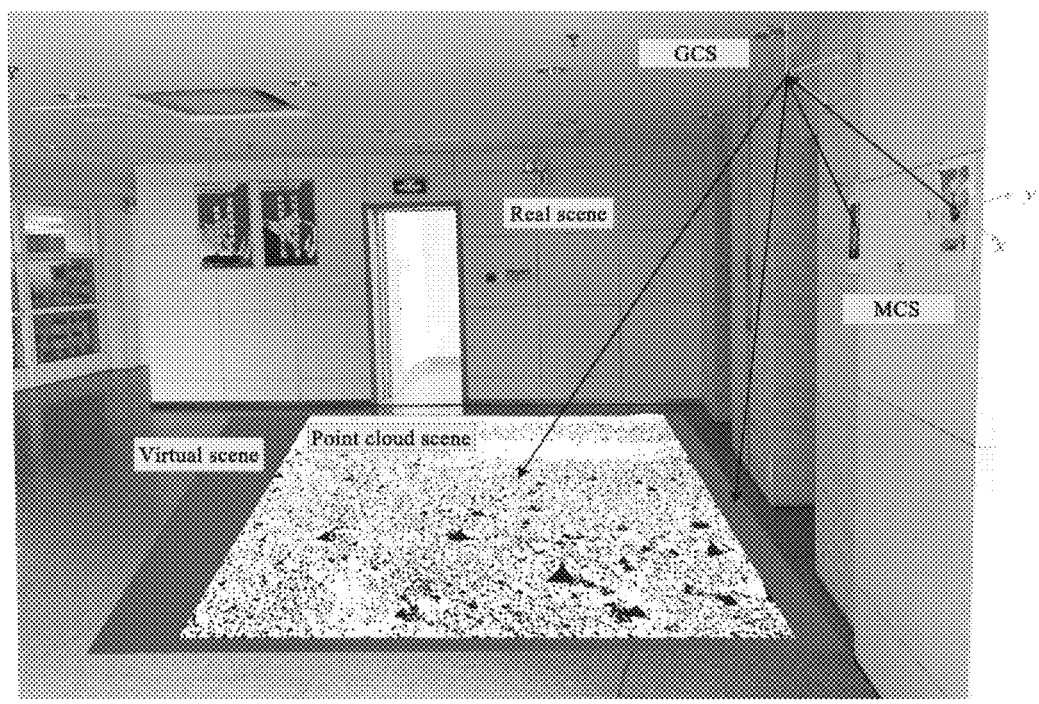
FIG. 6 is a schematic diagram of superposition and positioning of a virtual scene and a real scene according to at least one embodiment of the present disclosure.

Step 9. As shown in FIG. 6, average processing is performed on PGR1 and PGR2 to obtain PGR (x, y, z, rx, ry, rz, rt). Positions of AR/MR ECS and CCS relative to the environmental space where humans are located are obtained by reverse calculation using PCG and PGE, and the accurate positions of virtual scenes and point cloud scenes in the environmental space where humans are located are obtained.

Step 10. When there are multiple people collaboratively participating this measurement process, multiple coordinates PGRi of the GCS can be obtained according to the above steps 1~8. An average PGR is obtained by averaging PGR1, PGR2, . . . , PGRi, and the multiple coordinates are synchronously updated to the average PGR to further reduce the error.

Compared to the prior art, the present invention has the following beneficial effects.

In the present invention, multiple coordinate systems are established and the position relationship between the multiple coordinate systems are determined. The position of the point cloud scene in the remote scene and the position of the near-side virtual scene in the near-side environmental space through the real mark, so as to realize the high-precision matching and positioning for augmented reality and mixed reality. Through the method of the present invention, based on the position of objects marked in the real scene, it is possible to realize adaptive and accurate positioning of the position of the virtual objects in the augmented reality and mixed reality by overcoming spatial barriers. The scene in the virtual space is accurately superimposed into the near-side environmental space, which is convenient to realize the interactive operations, such as remote training and teaching and auxiliary guidance, under the comparison of the virtual reality and the real reality.

Methods for correcting errors between virtual scenes and real scenes are provided to further improve the accuracy of the method.

It should be noted that the relative terms such as "first" and "second" are only used for descriptive purposes, and cannot be understood as indicating or implying their relative importance or implicitly indicating the number of technical features indicated. Moreover, unless specified, the term "comprise" used in the present invention is intended to indicate the presence of features, steps, operations, devices, components, and/or a combination thereof.

The above embodiments are only used to illustrate the technical solutions of the present invention, and are not intended to limit the scope of the present disclosure. Although the present invention has been described in detail with reference to the embodiments, it should be understood that any changes, equivalent modification made by those skilled in the art shall fall within the scope of the present disclosure.

What is claimed is:

1. A method for matching a virtual scene of a remote scene with a real scene for augmented reality and mixed reality, comprising:

establishing a global coordinate system (GCS) at a position of a near-side virtual scene and a corresponding position of the remote scene, respectively;

in the remote scene: determining at least one physical mark that is stationary relative to the GCS; placing a remote camera for obtaining point cloud data of the remote scene, and building a camera coordinate system (CCS) based on the remote camera; wherein the CCS and the GCS are relatively fixed;

in a near-side environmental space: setting a real mark that is the same as the physical mark according to a position relationship between the physical mark and the GCS; establishing an augmented reality (AR)/mixed reality (MR) environmental coordinate system (ECS) by taking a position of an augmented reality (AR)/mixed reality (MR) device as an origin of the AR/MR ECS, and measuring a position relationship between the GCS and the AR/MR ECS;

in the near-side virtual scene: adding a virtual mark that is the same as the physical mark according to the position relationship between the physical mark and the GCS;

obtaining position information of the real mark in the near-side environmental space using a camera of the AR/MR device; determining a position of the point cloud scene fitted from point cloud data of the remote scene and a position of the near-side virtual scene in the near-side environmental space based on the position information of the real mark in the near-side environmental space;

establishing a mark coordinate system (MCS) in the remote scene according to a mark point of the physical mark, wherein x, y, z directions of the MCS are consistent with x, y, z directions of the GCS; and a position relationship between the physical mark and the GCS is represented by a position relationship between the MCS and the GCS; and based on a corresponding relationship between the real mark and the physical mark, establishing an MCS in the near-side environmental space according to a mark point of the real mark; wherein a position relationship between the real mark and the GCS is represented by the position relationship between the MCS and the GCS;

correcting an error between a virtual scene and a real scene;

wherein correction methods comprise a reverse-fitting adjustment method;

wherein the reverse-fitting adjustment method is a correction method for a fixed error source, and comprises: correcting a position error of the real mark;

correcting a mark error of a mark point of the real mark;
correcting an error of a corresponding relationship of the GCS in the virtual scene and the GCS in the real scene; and
correcting a distortion error caused by a shooting angle of the remote camera; and
wherein the step of establishing the global coordinate system (GCS) at the position of the near-side virtual scene and the corresponding position of the remote scene respectively comprises:
establishing the GCS at the remote scene and the GCS at the corresponding position of the near-side virtual scene through right-hand rule.

2. The method of claim 1, wherein the CCS comprises a point cloud data coordinate system generated by shooting the remote scene through the remote camera.

3. The method of claim 1, wherein the step of obtaining the position information of the real mark in the near-side environmental space using the camera of the AR/MR device comprises:
determining a position relationship of the real mark and the camera through RGB image recognition and depth information capture;
obtaining a position relationship between the real mark and the AR/MR ECS; and
determining the position information of the real mark in the near-side environmental space.

4. The method of claim 1, wherein the step of determining the position of the point cloud scene fitted from the point cloud data of the remote scene and the position of the near-side virtual scene in the near-side environmental space based on the position information of the real mark in the near-side environmental space comprises:
determining the position information of the GCS in the near-side environmental space according to the position information of the real mark in the near-side environmental space and the position relationship between the real mark and the GCS;
determining the position of the near-side virtual scene in the near-side environmental space according to the position information of the GCS in the near-side environmental space; and
determining the position of the point cloud scene in the near-side environmental space according to the position information of the real mark in the near-side environmental space, the corresponding relationship between the real mark and the physical mark, and the position relationship of the CCS and the GCS.

5. The method of claim 1, further comprising:
correcting an error between a virtual scene and a real scene;
wherein correction methods comprise a multi-mark-points matching method;
wherein the multi-mark-points matching method comprises:
setting a plurality of real marks in the near-side environmental space;
averaging the position information of the real marks in the near-side environmental space scanned by the camera in the AR/MR device to obtain an average of the position information; and
determining the position of the point cloud scene fitted from the point cloud data of the remote scene in the near-side environmental space and the position of the near-side virtual scene in the near-side environmental space according to the average of the position information.

6. The method of claim 1, further comprising:
correcting an error between a virtual scene and a real scene;
wherein correction methods comprise a multiple-users-assisted deployment method;
wherein the multiple-users-assisted deployment method comprises:
scanning the real mark by multiple user devices to obtain position data;
averaging the position data in a communication server to obtain an average of the position information of the real mark in the near-side environmental space; and
determining the position of the point cloud scene fitted from the point cloud data of the remote scene in the near-side environmental space and the position of the near-side virtual scene in the near-side environmental space according to the average of the position information.

\* \* \* \* \*